Sept. 5, 1972     L. ELSNER     3,689,343
PROCESS FOR CONTINUOUS MANUFACTURE OF GLASS FIBER
REINFORCED MODULES OF SYNTHETIC RESIN
Filed Aug. 1, 1969     3 Sheets-Sheet 1
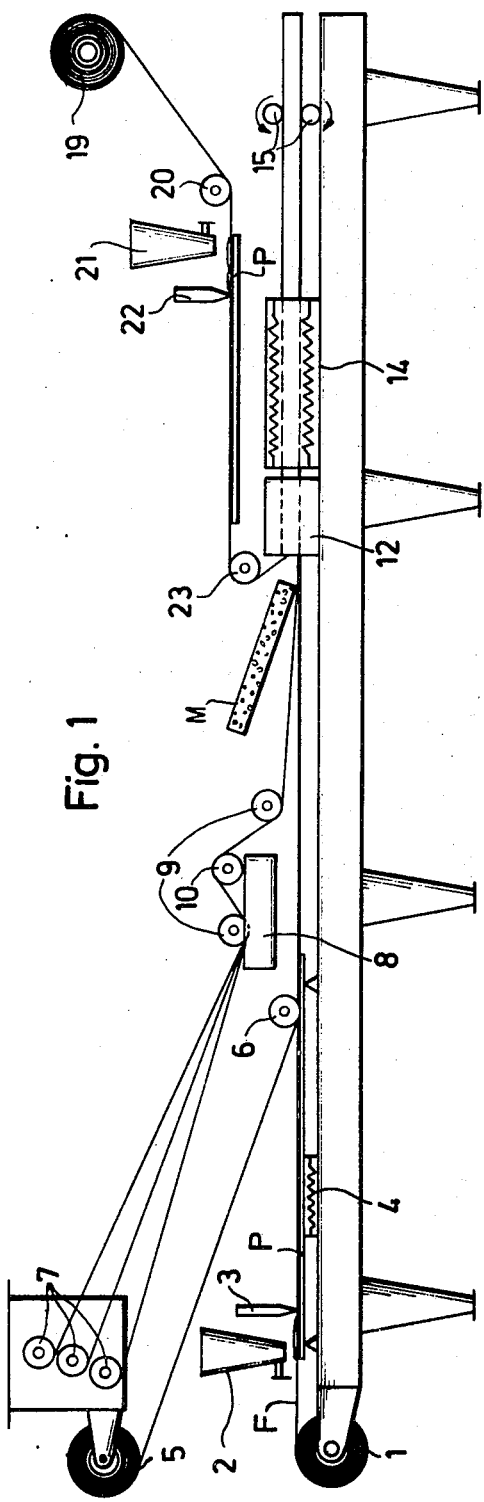
Fig. 1
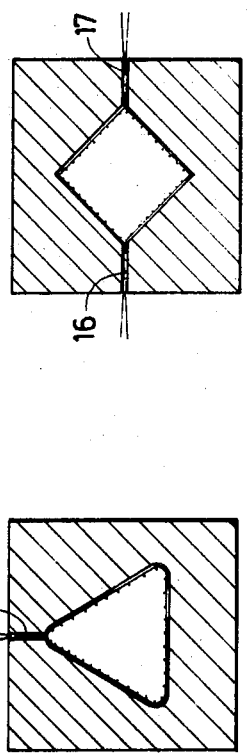
Fig. 2
Fig. 3

United States Patent Office 3,689,343
Patented Sept. 5, 1972

3,689,343
PROCESS FOR CONTINUOUS MANUFACTURE OF GLASS FIBER REINFORCED MODULES OF SYNTHETIC RESIN
Lothar Elsner, 19 Am oberen Schlossberg,
7141 Neckarrems, Germany
Filed Aug. 1, 1969, Ser. No. 846,717
Claims priority, application Germany, Aug. 1, 1968,
P 17 79 336.1
Int. Cl. B32b 5/10
U.S. Cl. 156—179
15 Claims

ABSTRACT OF THE DISCLOSURE

This invention relates to a method and apparatus for the continuous manufacture of modular elements of any desired cross-sectional area with or without a filler core element from a longitudinally advancing fibrous reinforced material to which may be also added running lengths of strengthening fibers with all of the elements being assembled on a longitudinally traveling synthetic resin coated web which is introduced into a forming die and extruded therefrom as an integrated, rigid product.

---

The invention relates to a method and apparatus for the continuous manufacture of modules of a predetermined configuration from longitudinally advanced fiber reinforced bat-like material, such as glass fibers, which is enveloped in at least one carrier sheet.

Since the field of application of thermoplastic synthetic resin is limited to structural components that do not perform a substantial load-bearing function, owing to the low modulus of elasticity, the manufacture of load-bearing structural components employs thermosetting plastic materials, i.e. synthetic resins, that can be worked with the same facility as thermoplastic materials under application of heat but, after a single hardening, can no longer be deformed by means of heat.

The manufacture of glass fiber reinforced modules of thermosetting synthetic resins which possess a load-bearing capacity is known. The glass fibers which up to an amount of ¾ of the module volume are applied in the form of mats, webs or twisted fiber strands increase to a considerable extent the load-bearing capacity of a module with regard to bending and other stresses.

Ordinarily, such modules are manufactured in a molding or drawing process, in a manner similar to wire drawing or metal extrusion. The glass fiber material is impregnated with liquid synthetic resin and compressed while passing through the drawing die. The excess of synthetic resin is prevented from entrance into the die. Gelling and extensive hardening take place in the die.

Since during the drawing process it cannot be avoided that the glass fiber material at the module circumference becomes partly uncovered from the adhering synthetic resin and is thus exposed, the modules or plates produced in this manner possess a rough surface. The fine filaments of the glass fiber material which are exposed on the surface of the module and which are oriented in the most different directions, form ramified capillaries which extend from the surface into the interior of the module. Accordingly, the non-sealed surface of known glass fiber reinforced modules of synthetic resin exhibits hygroscopic effects due to the capillaries formed by the not completely embedded glass fibers. When such modules are used and exposed to atmospheric agents, they are subjected to fast decay by corrosion. Furthermore, the rough and not sealed surface contributes to the accumulation of dust and dirt in the respective areas.

Consequently, until the present time, the extrusion of such modules of synthetic resin was ordinarily followed by a special finishing operation such as puttying, abrading, polishing, lacquering etc., in order to produce a smooth, non-porous surface. However, such a subsequent surface treatment is troublesome and expensive, especially in the case of complex modules, e.g. those with back tapers. Besides, such a subsequent coating leads to a defective bond between the material of the module and the coating layer since the former loses its activity to a considerable extent at the time of subsequent application of a synthetic resin lacquer. This drawback cannot be overcome by performing the subsequent coating immediately after the extrusion process since the module must be substantially hardened before the abrading and polishing operations take place.

The purpose of this invention is to obtain a process and means for providing modules of the above-mentioned type with a sealed, impact-resistant and, in particular, long-lasting surface at the time of manufacture of the modules. Accordingly, the invention proposes that a carrier sheet initially serving as a conveyor belt and having a width greater than the circumference of the module to be produced, be coated with a uniform layer of gelable liquid synthetic resin and lead through a molding tool. A web having a substantially smooth surface of fibrous material is then placed upon the gelled synthetic resin. This arrangement allows for the enveloping of the glass fibers impregnated with synthetic resin to form the core of the module and combines the advancing fibrous material therewith and this is later introduced to a preforming die tool where the structure is gradually compressed and constricted to the desired cross section of a particular module during which time the excess of the synthetic resin is caused to flow in a direction which is counter to the travel of the module. The carrier sheet having a width greater than the overall circumference of the completed module is then folded in such a manner to form a kind of molding tube or annular clamp so that the upper sides of the longitudinal edges of the supporting sheet are lying in close contact and project outwardly through a suitable longitudinal slot provided in the molding tool. Finally, the module is hardened by heating in the molding tool, whereafter the supporting or carrier sheet may be removed from the completed workpiece.

Accordingly, the purpose of the supporting sheet is to prevent a direct contact of the module material and the molding tool and to avoid adherence or ejection of the outer, slightly hardened or gelled layer of synthetic resin. This is facilitated by the band or web of fibrous material which prevents protrusion of the glass fibers forming the core of the module up to the surface thereof, which fibers frequently possess a high degree of hardness. A particular advantage of the enveloping, according to the invention, which is produced by means of sheets having a gelled cover layer and a fibrous web overlay can be seen in the fact that a module core of any material may be introduced into such an envelope.

In the case of large and complex module cross sections, two or more supporting sheets, with a width greater than the area of the module circumference to be covered by a particular sheet, are passed through the molding tool. Also here, the longitudinal edges of the upper sides of adjacent supporting sheets are in close mutual contact and project outwardly through longitudinal slots in the molding tool. The enveloping or covering arc varies with the width of available sheets or according to the area of the module circumference to be provided with an outer layer.

The supporting sheets provided for covering the upper area of the module circumference are coated on the upper side with liquid synthetic resin and fibrous or bat-like material and, before enveloping the glass fibers, which, for example, are combined into a strand, are deflected by 180° before entry into the molding tool or device. The deflection of 180° may be carried out in such a manner that the planes traversed by the supporting sheet are parallel to each other and the deflection is effected about the longitudinal or feed axis since the covering layer must be horizontal when applied to the conveying and supporting sheet.

In accordance with a further proposal of the invention, a shaped rod or web of hard foamed material corresponding with reduced dimensions to the general outline of the module to be produced is completely enveloped by glass fibers impregnated with synthetic resin and combined into the web during the feed into the molding tool. On the other hand, the module core may also be formed by several partial shaped rods of hard foamed material that are bonded to each other by means of a glass fiber mat additionally impregnated with synthetic resin, during the feed into the molding tool. This proposal leads to a module of a particularly high load-bearing capacity, if the above reinforcing elements are compressed under pressure by means of fibrous material enveloping the core. The reinforcing elements are bonded to the foamed core material by impregnation with synthetic resin as well as to the outer layer and, depending on the structural arrangement, form crosspieces of high load-bearing capacity after hardening.

When hollow modules are to be produced, one or more supporting sheets intended for the inner wall of the module and coated with synthetic resin and fibrous or mat-like material may be provided, their longitudinal edges being led in close mutual contact in a longitudinal slot provided in the tool mandrel.

The various web or strand materials are suitably advanced from the respective supply sources to the molding tool by means of a friction drive engaging the hardened module at the outlet from the molding tool or by means of a pair of gripping devices driven in longitudinal direction and engaging the module in alternation.

Other objects and advantages will become apparent from the following description taken in conjunction with the accompanying drawings, in which:

FIG. 1 shows the apparatus for preforming the method in horizontal elevation;

FIG. 2 shows in cross section one type of molding tool for a relatively simple synthetic resin module;

FIG. 3 shows in cross section a molding tool for producing a four-sided module;

Figures 4, 4A:
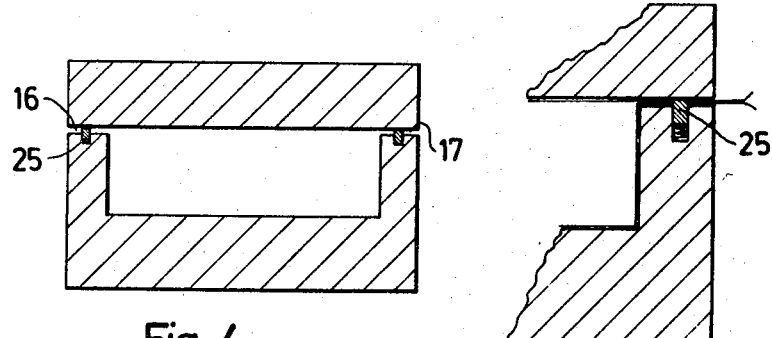
FIG. 4 shows in cross section another embodiment of a tool for a flat or relatively wide synthetic resin module.
FIG. 4a shows another embodiment of that portion of the tool of FIG. 4 on an enlarged scale.

Turning now to the drawing of FIG. 1, a covering and supporting sheet F of thermosetting plastic material, corresponding in width, e.g. to the module to be covered in the molding tool of FIG. 2, is lead from a rotary supply roll 1 onto a plate P and passed under a suitable coating applicator device 2 which discharges a liquid synthetic resin onto the upper surface of sheet F. A doctor blade 3 may be employed for uniform application of the layer to the surface of the sheet. The liquid synthetic resin is caused to gel by heating device 4 comprising resistance heating elements which may be arranged above and below the path of travel of the sheet. Later, the gelled synthetic resin forms the outer coat (gel coat) of the produced synthetic resin module.

A web of fleecy material consisting, e.g. of glass fibers or other generally similar material, is supplied in a running sheet from a supply roll 5 arranged above the plane of the sheet trajectory and smoothly applied onto the gelled synthetic resin by means of one or more feed rollers 6. In the next step of the process, filler material for the interior of the synthetic resin module is supplied. For such a purpose, glass fibers or roving strands are taken, e.g. from several supply rolls or spools 7, and led through a container 8 to be impregnated with synthetic resin. The excess synthetic resin is scraped or squeezed from the glass fiber strands by guide rollers 9 and 10 and flows back to the container. On the other hand, in place of the arrangement illustrated, pregrouped glass fiber strands may also be employed, which, moreover, could have been already combined with the fibrous material. The use of fibers or other web material serving as a reinforcement can be freely selected. In case of thin-walled modules, for instance, only a web of fleece-like material or other glass mat material may be employed or otherwise twisted roving strands in association with a somewhat thicker gel coat layer. Naturally, in place of the roving strands referred to, others such as metal, graphite fiber, beryllium etc. may also be employed.

The glass fiber strands are enveloped with the sheet F and the web 5 at the entrance to the molding tool 12. This covering takes place in such a manner that the web of soft material is adjusted in width to the circumference of the module and forms a continuous cover layer with the pre-gelled outer coat while the sheet in a tool according to FIG. 2 is folded so that its lateral edges lap over the mat 5 and extend from slot 13 of the tool or molding device. Preferably, slot 13 has only such dimensions that two superposed sheets may slide therein whereas the outflow of resin from the molding device is prevented. By introduction into the molding tool, the material M is compressed and, at the same time, the excess synthetic resin is ejected outwardly counter to the direction of feed until the strand is constricted to the cross section of the module. Molding tool 12 which forms the die proper is positioned adjacent to a longer molding device 14 having an identical configuration. A heating device, as shown, for hardening the synthetic resin is provided in the latter molding device. The hardened completed module subsequently to the discharge from molding devices 12 and 14 is advanced by means of a gripping device, e.g. by feed rollers 15 according to FIG. 1, thus permitting a continuous travel thereof, whereafter the module may be cut to predetermined lengths suitable for transportation. The carrier sheet F, which at this stage may still adhere to the module, may be left thereon as a protective covering for shipment or be removed immediately so that the extremely smooth module surface of synthetic resin, corresponding to the sheet surface, becomes visible. In some instances, users may demand a synthetic resin module, the surface of which is not extremely smooth but dull and wood-like, having a grooved or waffled effect. In such case, the sheet may be provided originally with a mat surface or be passed over an embossing roller before employment so that the finished module possesses the desired surface effect and after-treatment is not required. Besides, the gel coat layer may be suitably colored or even provided with a metallic effect by admixing particles (size 1–2μ) of refined steel, aluminum or gold into the resin in container 2, which particles are deposited on the sheet and produce a continuous resin-bonded metallic surface on the finished module so that an additional protection against corrosion and heat is obtained besides the optical and aesthetic effect.

When the tool according to FIG. 3 is employed, e.g. in the manufacture of four-sided modules, a single conveying sheet is no longer sufficient. In such case, the lower supporting sheet taken from roll 1 has only a width sufficient for covering one half of the module and its longitudinal edges will project through lateral slots 16 and 17 of the molding device according to FIG. 3. According to FIG. 1, a further conveying and supporting sheet for covering the upper half of the module is fed from a supply roll 19, having the same width as supply roll 1, led along a guide roll 20, under a coating device 21, a doctor blade 22, adjacent a heater (not shown), and over a guide roll 23, and at the entrance to the molding device 12, is then combined with the other strand material.

The process is also suitable for manufacturing a wide flat module in a tool such as shown in FIG. 4. In this instance, the lower conveying sheet is wider or a larger portion of its width is utilized than that portion of the upper sheet which is used. Spring-loaded sealing lips or packing strips 25 are arranged in grooves inside slots 18 and 19 of the molding device according to FIG. 4 for pressing the two sheet edges together and against the opposite wall of the slot so as to prevent discharge of the resin. FIG. 4a illustrates the arrangement of the sealing lips 25 and the sheets extending therefrom on an enlarged scale. In a molding device with two slots arranged symmetrically in relation to the longitudinal axis of the tool, sealing lips 25 are preferably convergent in the direction of flow.

In the case of complex modules, more than two sheets may be employed so that the sheets can be fitted to the complex outlines of the modules in the molding device. The conveying and supporting sheets are then supplied from various supply rolls and possibly arranged at uniform intervals radially in relation to the main axis of the module feed. The sheets are then advanced, coated and guided in the same manner as shown and described in FIG. 1 with relation to the upper sheet trajectory. In the case of a delicate module, e.g. susceptible to breakage on account of its shape, the drive may merely engage the edges of the sheets.

Figure 5:
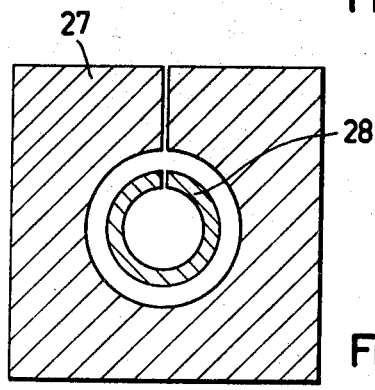
FIG. 5 shows a still further type of tool for producing a hollow module.

FIG. 5 is a schematic representation of a molding device for manufacturing a hollow module, an inner core 28 and an external tool 27, each element being provided with a slot as shown. However, the slot in the core or mandrel 28 is required only where the inner surface of the module is to be provided with a sealed or smooth surface and, accordingly, a supporting sheet must be employed.

Figure 6:
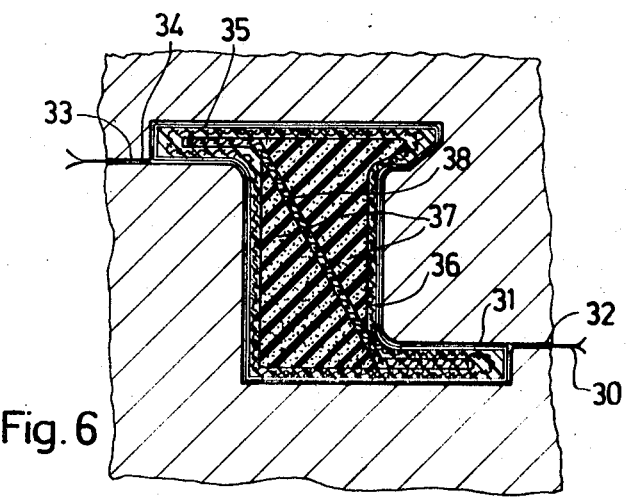
FIG. 6 shows in cross section a specific type of module, the covering sheets enclosing the module being indicated in the guide slots of the molding tool.

In larger modules, a portion of cross section is filled by one or more cores of foamed material, which is expedient for reasons of weight and permissible with regard to strength. Such a module is illustrated in FIG. 6. It consists of two adhering sheets 30 coated with a layer 31 of synthetic resin forming an overflow tail 34 at the superposed edges of the sheets in the slots 32 and 33 of the molding device, which tail can be trimmed off, e.g. by means of crushing rolls, immediately after the hardened module is discharged from the molding device. Toward the center of the module, a fibrous material 35 which carries the coating layer is followed by another layer 36 of glass fibers which are impregnated with a synthetic resin and consist of a mat, web or strands. The module is filled by two core parts 37 of foamed material bonded to each other by means of a resin-impregnated bonding mat 38 having the effect of a crosspiece. Bonding mat 38 may form a single web with glass fiber layer 36 and be folded in any suitable manner. In the manufacture of such a module filled in part with foamed material and stabilized by means of a crosspiece, foamed cores 37 in pre-cut lengths are conducted over transport chutes into the area of the apparatus where the external layers of glass fibers 36 is already impregnated with resin and wrapped around the foamed cores at the inlet of the molding tool.

Figure 7A:
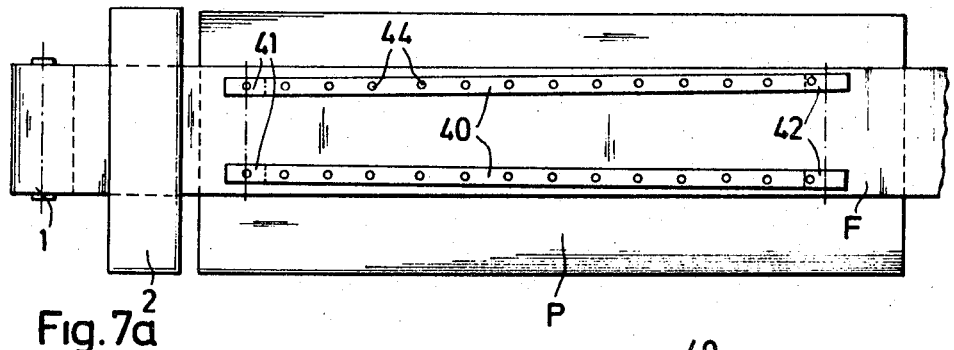
FIG. 7a shows a plan view of an embodiment of a sheet-tensioning device.
Figure 7B:
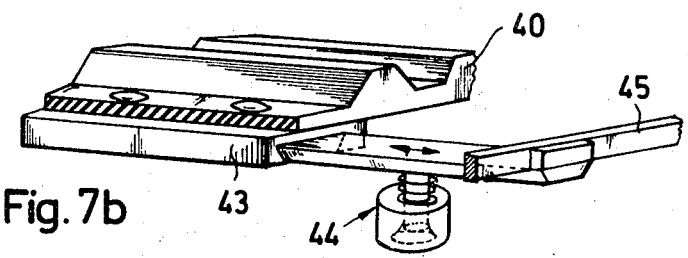
FIG. 7b is a partial perspective view of the sheet gripping mechanism.

An essential feature of the invention consists in the gel-coat layer produced in the process. It prevents exposure of glass fibers on the outer surface of the module and, consequently, the gradual decay and discoloration of synthetic resin on account of the initial microporosity, In order to prevent longitudinal folds or wrinkles caused by tension in the sheet and variable thickness of the gel-coat in depressions and elevations of the sheet thus formed, sheet F, according to FIG. 7, is coated in a continuous process and stretched in a transverse direction and maintained smooth during the advance over heated plate P. In particular, for preventing curving or arching of the edges of the sheets, two endless toothed belts 40 are arranged above plate P of the uncoated edges of the sheets and guided by means of gears 41 and 42. Toothed belts 40 are provided with a number of riveted dove-tailed guides 43 for sheet grippers 44 displaceable in a transverse direction, e.g. by means of rubber suction legs which, resting continuously on the sheet F, are shifted outwardly from their central longitudinal axis by means of an adjustable guide rail 45 while the sheet is advanced over plate P. The return movement of grippers 44 is effected by springs or by an additional guide rail on the upper strand of the belt. The continuous sheet contact of the grippers between cog wheels 41 and 42 is provided by means, not shown. The two toothed belts 40 may be pre-arranged with slightly diverging directions so that the guide rails 45 may be set in parallel thereto or in a direction of greater divergence. The drive by means of gears 42 is so dimensioned that sheet F at the end of heated plate P is free of detrimental longitudinal tensions due to the traction drive engaging the molding device.

FIG. 8 shows further devices arranged in front of the entrance to the molding device where a complicated shape of module is envisioned. In this case guides are provided for the sheets F coated with gel-coat and possibly with a bat-like material, the guides being arranged to allow for the gradual natural folding of the sheets as they narrow toward the entrance of the molding device. Thus, guide plates 50—50 adapted to the natural folding of the sheets are arranged for each sheet directly ahead of the molding device. A vacuum device 51 applied to the plates over several openings urges the sheets into contact with the inlet plates.

A further means for securing a regular introduction of sheets into the molding device includes a further guide 52 which is ararnged in front of the inlet plates 50—50. The edges of the sheet which are still flat or spread out are guided in lateral facing slots 53 of the guide (FIG. 8b). Vacuum may be applied to the supporting surface width of the sheet in order to prevent a premature, uncontrolled formation of folds. Furthermore, at this point in order to reduce the friction of the sheet in the molding device and at the plate arranged in front thereof, a felt or wick 54 is provided with a suitable heat-resistant lubricant.

Figure 8A:
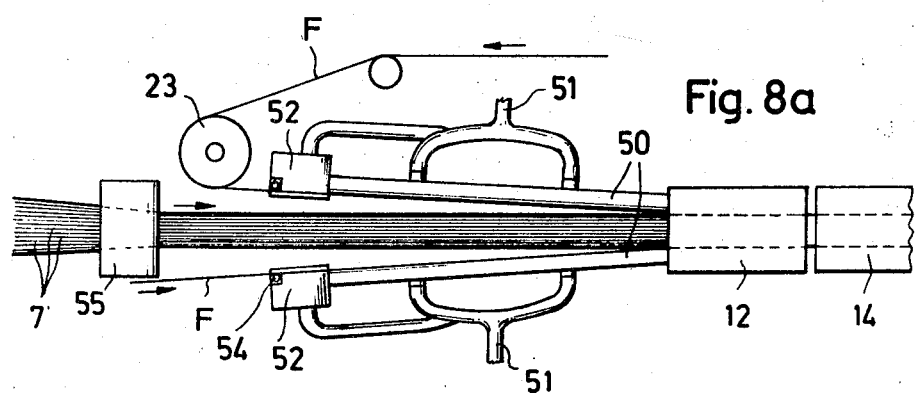
FIG. 8a is a side elevational view of the details of the material guide before introduction into the tool.
Figure 8B:
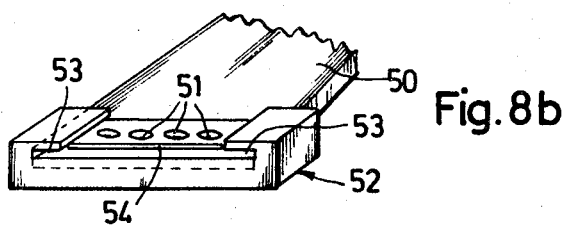
FIG. 8b is a partial perspective view of a guide mechanism for the edge of the sheet.

Strands 7 of glass fibers impregnated with resin and introduced between two sheets F in accordance with FIG. 8a are compressed and preformed to a certain extent by means of a squeezing tool 55 which possesses substantially the same outline as the main molding device (but on a scale enlarged up to 1.2) and serves particularly for the elimination of excess resin. The unheated tool section 12, which forms part of the material entrance, also features a slightly, gradually narrowing throat area, thus shaping the module as it enters the tool. A constriction and compression of the resin-impregnated material to the final cross section without heating is required for an immediate resumption of operation after a standstill.

That which is claimed is:

1. A method for the continuous manufacture of a fiber reinforced synthetic resin module of predetermined cross section comprising advancing a flexible carrier sheet capable of being removed from the finished module, depositing a layer of liquid thermosetting synthetic resin on a surface of said sheet, gelling said resin, applying fibrous reinforcing material to said gelled resin while avoiding protrusion of the fibers of the reinforcing material through the gel layer to the surface of said layer adjacent the carrier sheet, forming the carrier sheet to at least partially enclose the resin and reinforcing material and passing the formed carrier sheet through a die, and heating the resin to set it thereby forming a fiber reinforced synthetic resin module having a non-porous surface of synthetic resin.

2. The method of claim 1 comprising heating the resin to cause it to gel.

3. The method of claim 1 comprising bringing the margins of the carrier sheet tightly adjacent to each other and passing them through a slot in said die member while tightly pressing them together to prevent outflow of resin between the edges.

4. The method of claim 1 comprising tensioning the carrier sheet transversely at its margins while advancing it.

5. The method of claim 4 comprising carrying out the tensioning step while said resin is being gelled and the fibrous material is being applied.

6. The method of claim 5 comprising tensioning the carrier sheet by diverging gripper means engaging the sheet and traveling with it.

7. The method of claim 1 in which at least one carrier sheet forms a cover enclosing the cross sectional shape of the module.

8. The method of claim 7 comprising bringing the margins of a plurality of carrier sheets tightly adjacent to each other without adhering them together to form the desired cross sectional shape of the module and passing them through slots in said die member while tightly pressing the together to prevent outflow of resin.

9. The method of claim 8 comprising adding reinforcing fibers coated with a synthetic resin and a length of foamed material to the assembly before the carrier sheets are folded to form the desired cross section, the foamed material forming a core for the finished module.

10. The method of claim 8 comprising resiliently pressing the margins of the sheets together over a limited area while in the slots of the die member.

11. The method of claim 8 in which the desired cross sectional shape has a hollow center including the step of passing the margins of a carrier sheet through a slot formed in a core member of the die.

12. The method of claim 7 comprising guiding and folding at least one carrier sheet during its advancing movement prior to its entrance into the die member.

13. The method of claim 12 comprising holding at least one carrier sheet to a guiding means by a vacuum.

14. The method of claim 7 comprising supplying the fibrous reinforcing material as a running sheet for applying to said resin, coating reinforcing fibers with synthetic resin and applying them to the sheet of fibrous material.

15. The method of claim 14 comprising applying a length of foamed material to the coated reinforcing fibers to form a core.

References Cited

UNITED STATES PATENTS

| | | | |
|---|---|---|---|
| 2,927,623 | 3/1960 | Huisman et al. | 156—179 |
| 3,345,234 | 10/1967 | Jecker et al. | 156—209 |
| 3,449,187 | 6/1969 | Bobkowicz | 156—178 X |
| 2,771,387 | 11/1956 | Kleist et al. | 156—179 X |

FOREIGN PATENTS

| | | | |
|---|---|---|---|
| 556,117 | 4/1958 | Canada | 56—276 |

BENJAMIN A. BORCHELT, Primary Examiner

G. E. MONTONE, Assistant Examiner